Figure 1:
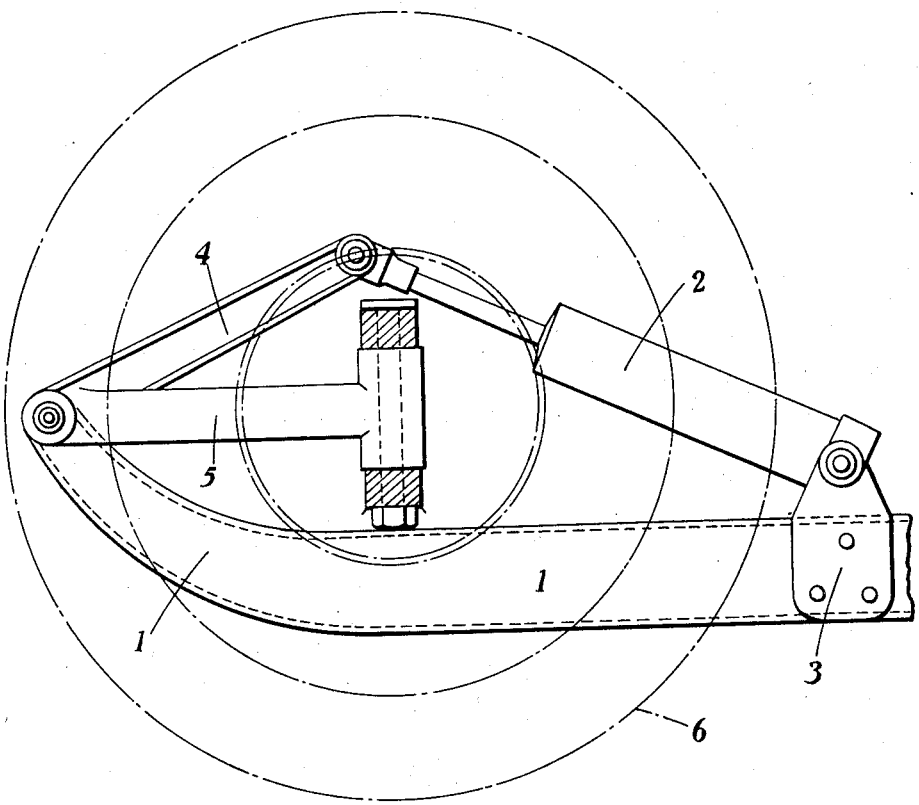

Sept. 20, 1932.    S. A. HORSTMANN    1,877,878
SUSPENSION SYSTEM FOR MOTOR CARS AND VEHICLES OF ALL KINDS
Filed Jan. 8, 1929    7 Sheets-Sheet 1

INVENTOR
S. A. Horstmann
BY
Ernest Wilkinson
ATTORNEY

Sept. 20, 1932. S. A. HORSTMANN 1,877,878
SUSPENSION SYSTEM FOR MOTOR CARS AND VEHICLES OF ALL KINDS
Filed Jan. 8, 1929 7 Sheets-Sheet 2
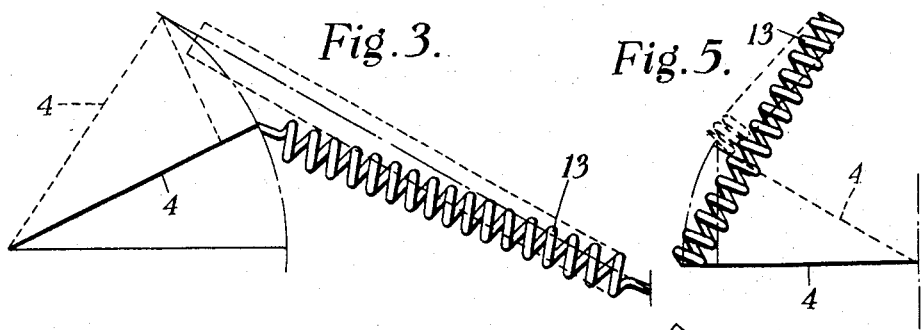
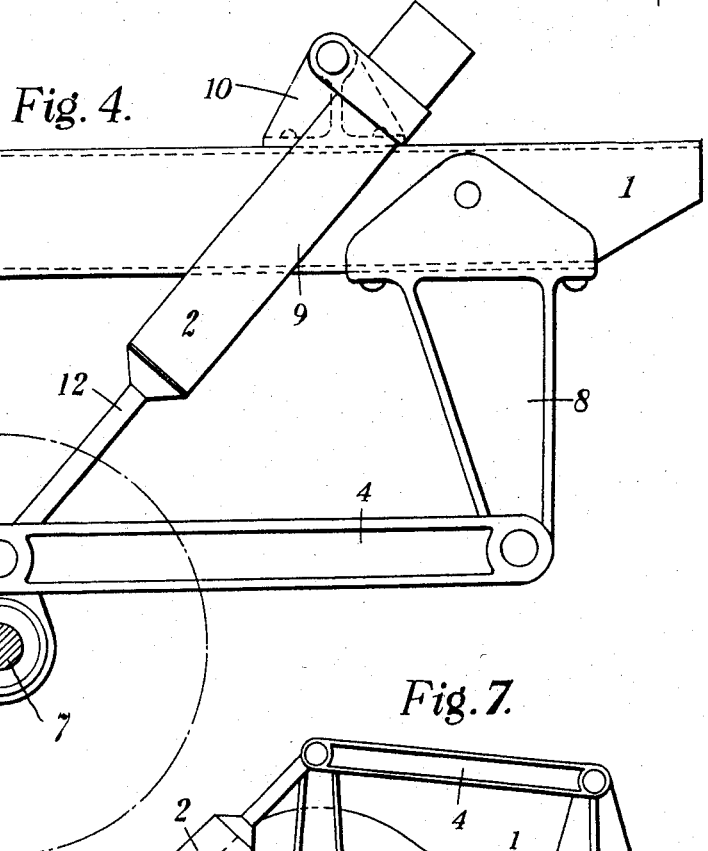
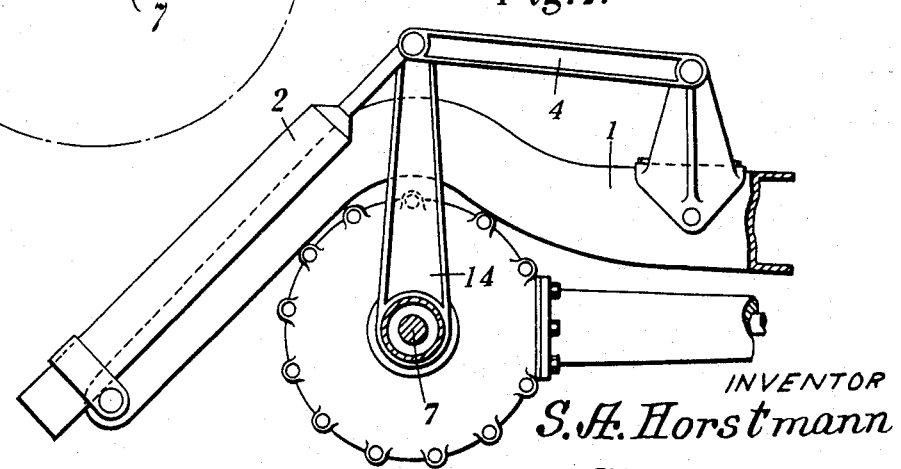
INVENTOR
S. A. Horstmann
BY
Ernest Wilkinson
ATTORNEY

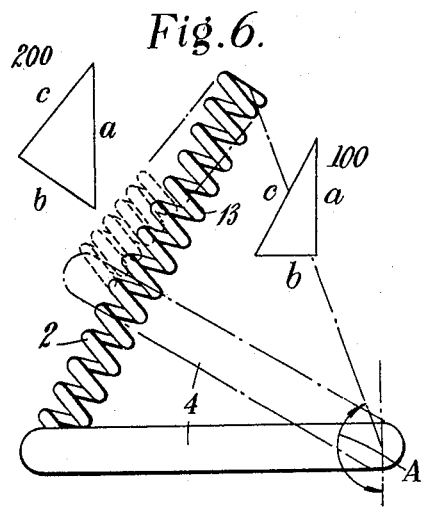
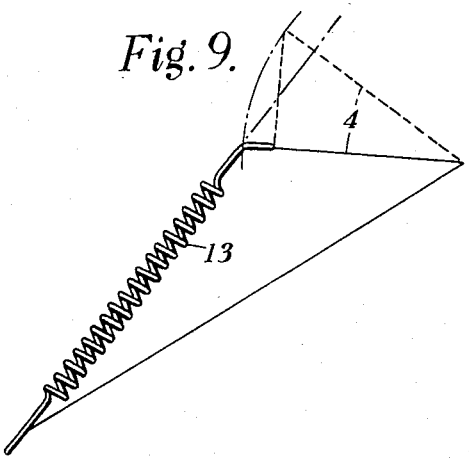
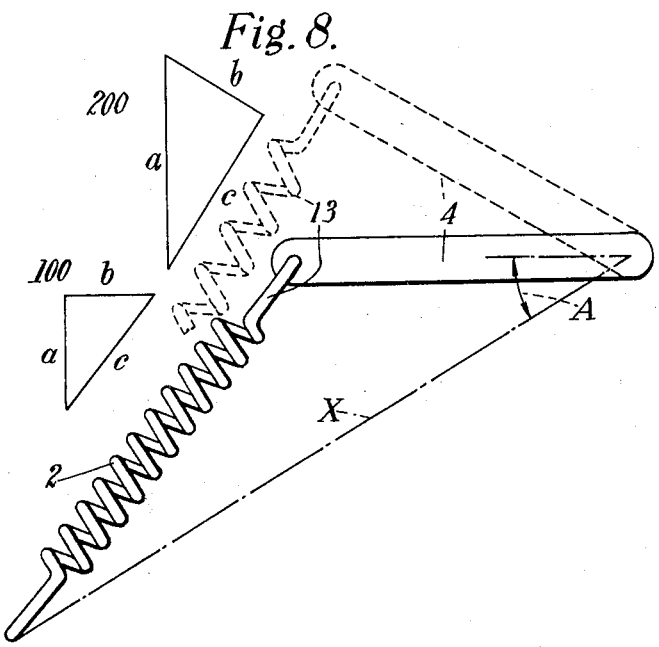

Sept. 20, 1932.  S. A. HORSTMANN  1,877,878
SUSPENSION SYSTEM FOR MOTOR CARS AND VEHICLES OF ALL KINDS
Filed Jan. 8, 1929  7 Sheets-Sheet 4
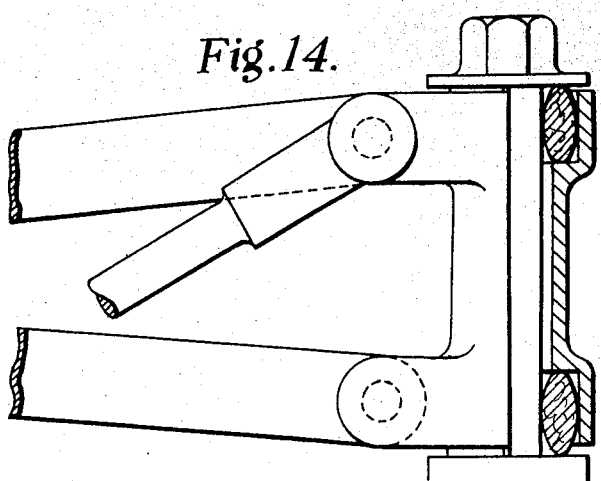
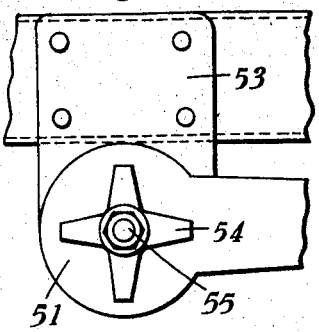
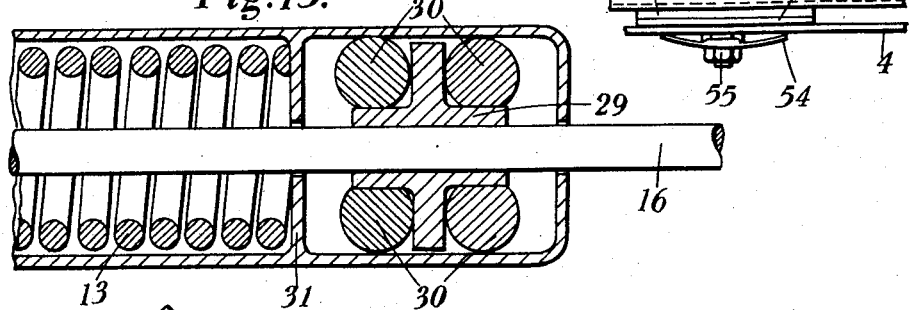
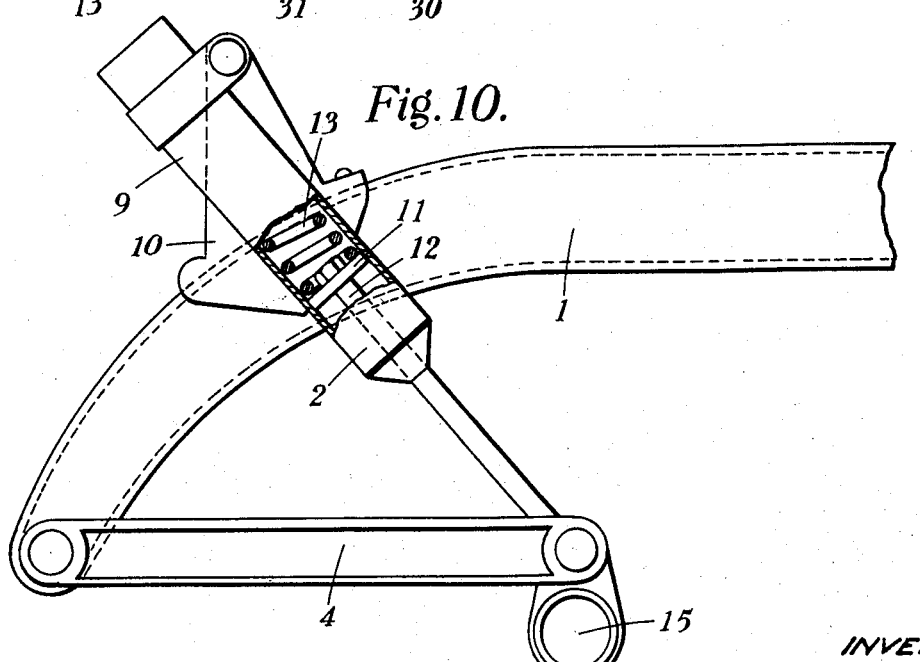
INVENTOR
S. A. Horstmann
BY
Ernest Wilkinson
ATTORNEY Sept. 20, 1932.  S. A. HORSTMANN  1,877,878
SUSPENSION SYSTEM FOR MOTOR CARS AND VEHICLES OF ALL KINDS
Filed Jan. 8, 1929   7 Sheets-Sheet 5

INVENTOR
S. A. Horstmann
BY
Ernest Wilkinson
ATTORNEY

INVENTOR
S. A. Horstmann
BY
Ernest Wilkinson
ATTORNEY

Sept. 20, 1932.  S. A. HORSTMANN  1,877,878
SUSPENSION SYSTEM FOR MOTOR CARS AND VEHICLES OF ALL KINDS
Filed Jan. 8, 1929  7 Sheets-Sheet 7

INVENTOR
S. A. Horstmann
BY
Ernest Wilkinson
ATTORNEY

Patented Sept. 20, 1932

1,877,878

UNITED STATES PATENT OFFICE

SIDNEY ADOLPH HORSTMANN, OF BATH, ENGLAND, ASSIGNOR, BY MESNE ASSIGNMENTS, TO SLOW MOTION SUSPENSION LIMITED, OF BATH, ENGLAND

SUSPENSION SYSTEM FOR MOTOR CARS AND VEHICLES OF ALL KINDS

Application filed January 8, 1929. Serial No. 331,085.

This invention relates to improvements in vehicle suspension systems.

In ordinary suspension systems the periodicity changes with every variation of load. In general practice the optimum periodicity can only be arranged for one specific load, usually the heaviest.

In usual present day practice the periodicities are determined by load deflection, the greater the load the more comfortable the periodicity. It follows in the case of vehicles in which the variation of load varies greatly between the minimum load and a maximum load such as in light cars, load-carrying lorries, and public service vehicles, that if a comfortable periodicity is to obtain for light loads a very large deflection must be tolerated for heavy loads. The larger the deflection the greater the wing clearance required.

This variation of periodicity arises because suspension systems, as usually applied to automobiles, are harmonic in principle and characterized by the fact that deflection increases in direct proportion to the load. That is to say if load and deflection are plotted on a graph the result will be a straight line.

Now periodicity is actually determined from the relation $$\text{Periodicity} = \sqrt{\frac{35230}{\frac{W}{\frac{dw}{dD}}}}$$

In the harmonic system where the deflection D is equal to the load divided by the rate of change of the load with respect to the deflection, i. e., $$D = \frac{W}{\frac{dw}{dD}}, D,$$

and therefore $$\frac{W}{\frac{dw}{dD}}$$

varies with each load increment, so that the periodicity obtained from the relation $$\text{Periodicity} = \sqrt{\frac{35230}{\frac{W}{\frac{dw}{dD}}}}$$

also varies for each load increment.

According to the present invention the quantity $$\frac{W}{\frac{dw}{dD}}$$

is kept substantially constant so that the periodicity also remains substantially constant.

According to the present invention the factor $$\frac{W}{\frac{dw}{dD}}$$

is kept substantially constant so that the periodicity also remains substantially constant.

Another object of the present invention is to give not only a substantially constant periodicity for any loading, so that the optimum can obtain throughout the loading range, but also a very low and comfortable periodicity.

Another object is to provide a suspension system in which means for damping oscillations is readily applied.

Another object is to provide a suspension system which can be readily adjusted for any particular load.

Another object is to provide a suspension system in which assembly of the parts is facilitated.

Other objects will be in part obvious or in part pointed out hereinafter.

Under the present invention the method of vehicle suspension consists in carrying the load on a suspension system made up of an elastic force and of a reactionary component in the form of a pivoted lever.

To attain the object of our invention it is necessary, inter alia, that as the load increases the change in the compression (or extension) of the spring component produced by a given small vertical displacement of the load should increase, and it is for this purpose that we so arrange the parts that with increase of load the perpendicular from the axis of the pivot on the line of the spring increases and therefore for a given angular movement of such pivot the change in the length of the spring is increased. There is however another factor which must be considered viz the ratio of the angular deflection of the lever to such vertical displacement of the load. In order to obtain the desired increase in the rate of change of length of the spring it is desirable that this ratio should also increase, but it is absolutely necessary in order to render the attainment of our object possible that the product of the two ratios viz change in length of spring to angular deflection, and angular deflection to vertical displacement, must increase, e. g. if the spring were substantially horizontal and the two arms of the lever at right angles in such an arrangement as is shown in Fig. 1 the result could not be obtained. In order that the second factor may also increase, the inclination to the horizontal of the arm joining the axis of the lever to the point of suspension of the wheel should increase with the load, as it does in the arrangements here illustrated.

This ensures the rate of change of load in respect to the deflection of the system is of an increasing order as the load increases, but it is also necessary that the parts should be so proportioned and arranged that the quotient $$\frac{W}{\frac{dW}{dD}}$$

or in other words the product $$W \frac{dD}{dW}$$

should remain substantially constant.

Certain other characteristics of our invention relating to the ratio of the vertical component of the suspension force to the force exerted by the spring component will be explained later.

The accompanying drawings show various possible embodiments of the mechanical features of the system as applied to carrying out the method of suspension according to the present invention.

In the drawings:—

Figure 2:
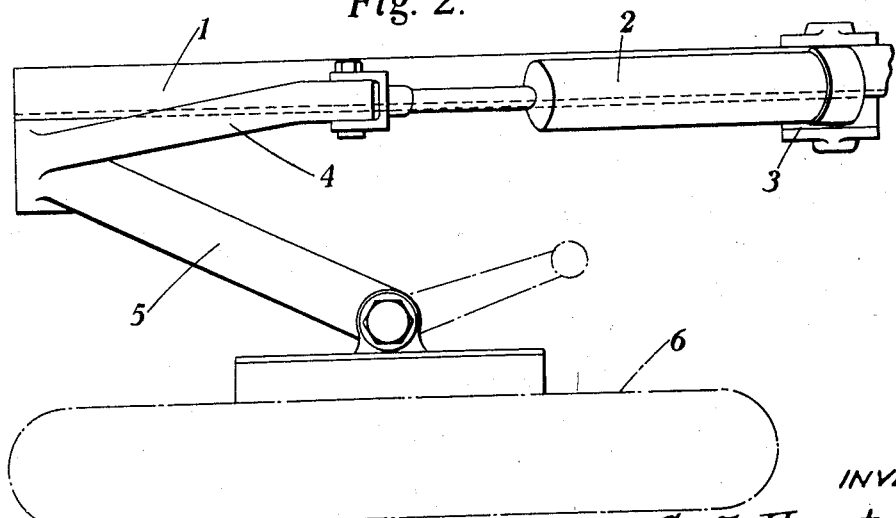
Figure 11:
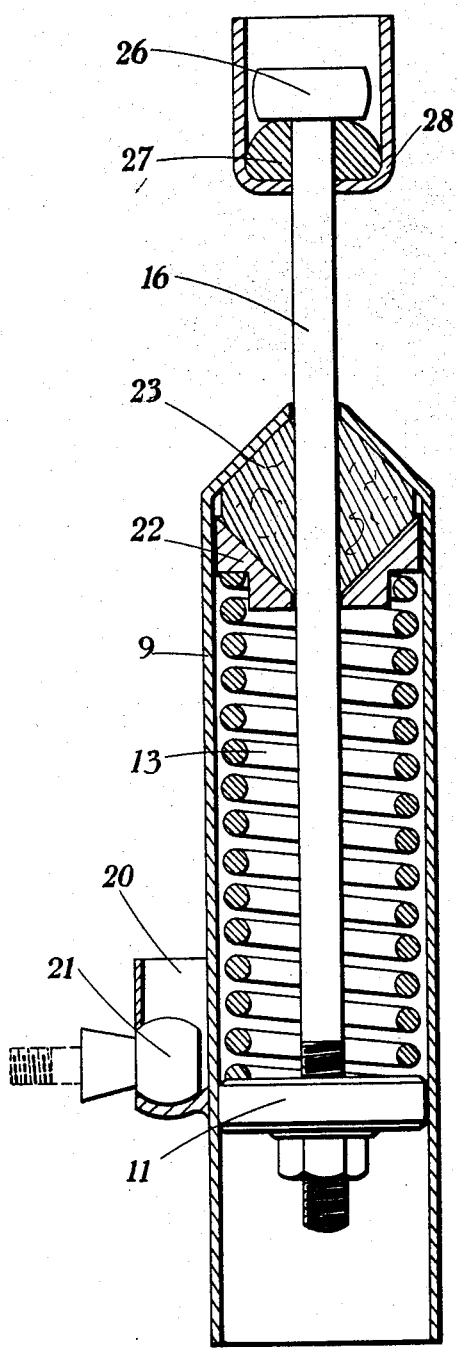
Figure 12:
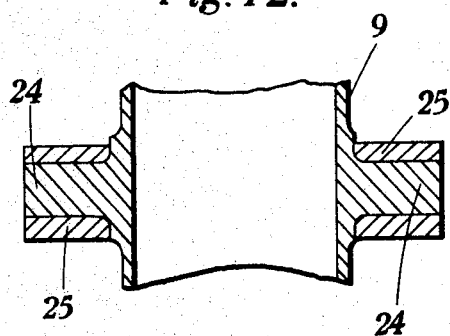
Figure 13:
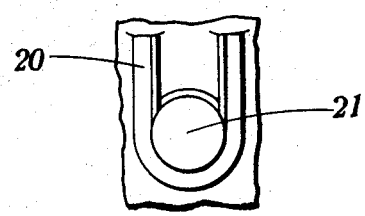
Figure 18:
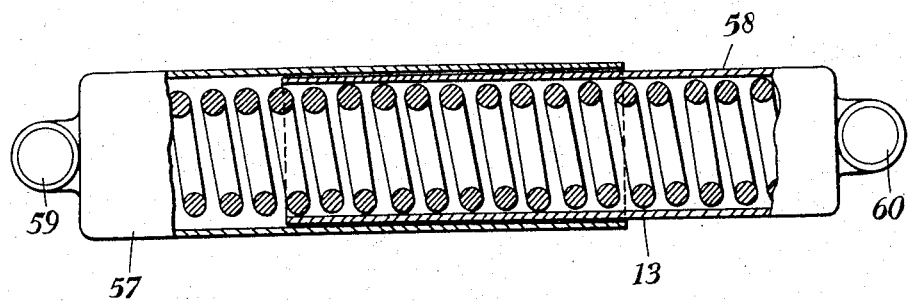
Figure 19:
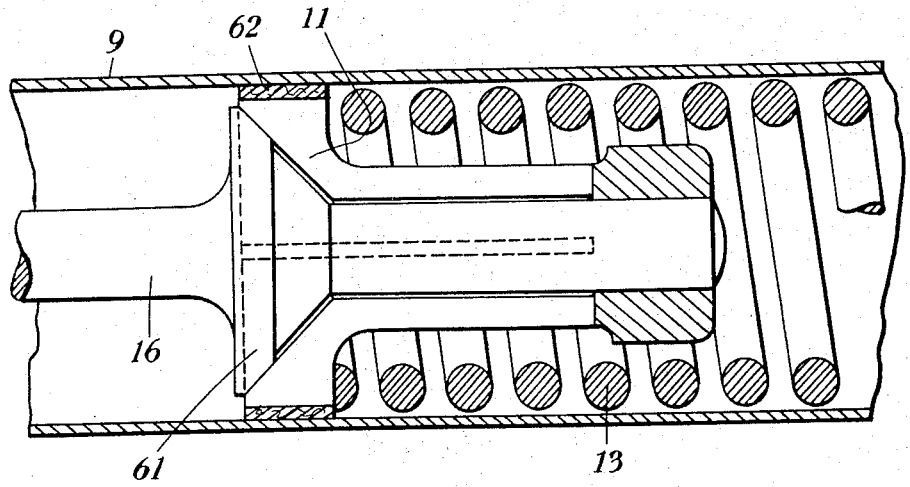
Figure 20:
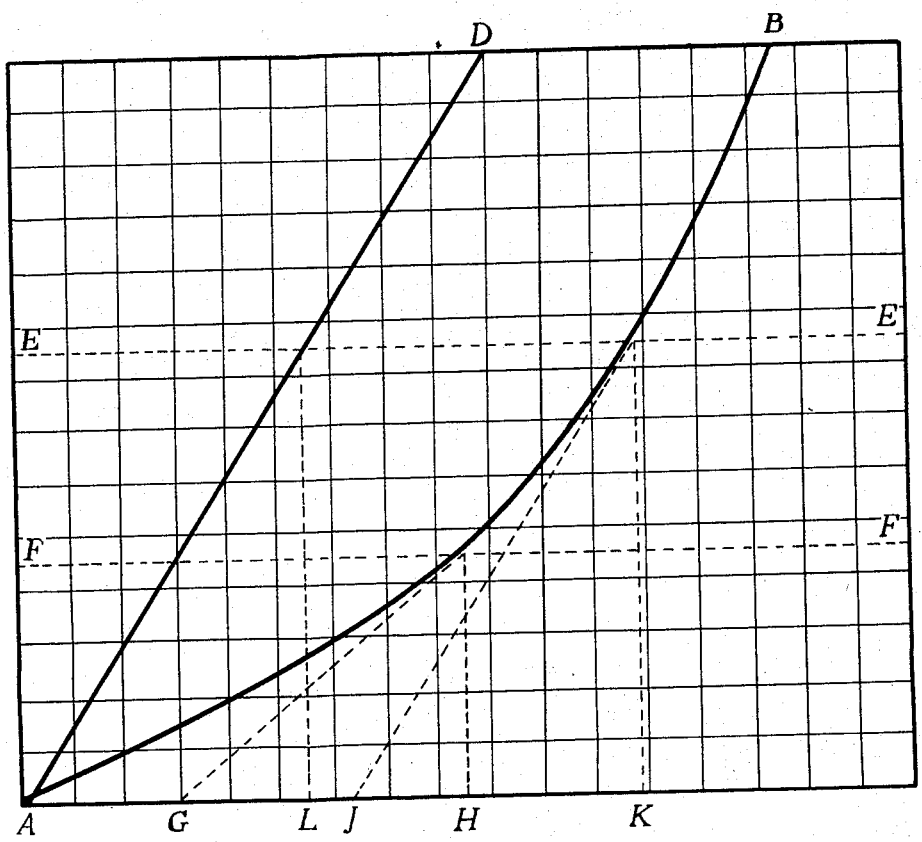
Figure 21:
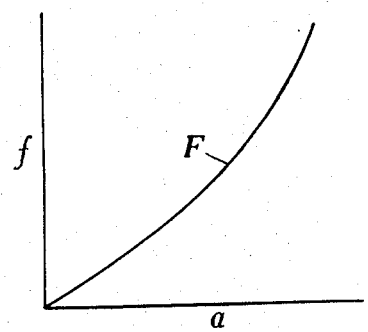

Fig. 1 is a side elevation, and Fig. 2 a plan of one form of spring suspension according to the present invention. Fig. 3 is a diagrammatic view showing the changes in position of the members. Fig. 4 is a side elevation of another form, and Fig. 5 a diagrammatic view similar to Fig. 3, and Fig. 6 a diagrammatic view of Fig. 4 showing in dotted outline the position of the parts due to load increment. Fig. 7 is a side elevation of an exemplary form, applied to a rear axle, Fig. 8 a diagrammatic view of Fig. 7 showing in dotted outline the position of the parts due to load increment, and Fig. 9 a diagrammatic view showing the changes in position of the members. Fig. 10 is a side elevation of a further variant, Fig. 11 is a side elevation of an elastic force component, Fig. 12 illustrates one way of attaching said component to a part of the vehicle. Fig. 13 is an end view of Fig. 12, Fig. 14 illustrates a way of connecting the reactionary force component to a vehicle axle. Fig. 15 illustrates means of applying frictional restraint to the lengthening or shortening of the elastic force component. Figs. 16 and 17 are respectively a side elevation and plan of one way of applying frictional restraint to the reactionary force component. Fig. 18 is a sectional view of a modified form of the elastic force component. Fig. 19 shows another method of applying frictional restraint to the lengthening or shortening of the elastic force components, while Fig. 20 is a graph of the load deflection curve of the applicant's suspension system compared with the usual harmonic system. Fig. 21 is a graph hereinafter referred to.

Referring to Figs. 1 and 2 the spring suspension system is shown applied to an underslung frame. 1 is the frame, 2 the elastic force component including a spring which is pivoted at one end to the frame 1 by brackets 3 and pivoted at its other end to a lever 4, which is rigidly secured to a lever 5, both levers 4 and 5 being pivoted to an upturned end of the frame 1, and the wheel 6 being rotatably mounted on the free end of the lever 5.

In this arrangement the member 4 is adapted to act as the reactionary force component of the system and the lever 5 is considered to be an integral part of the said reactionary member. The vertical force component becomes a greater proportion of the elastic force as the load on the vehicle is increased. This arrangement is well suited for the front of a vehicle and allows of independent wheel springing.

Fig. 4 is a side elevation showing a form of the invention applied to the rear axle of a vehicle. The axle 7 is connected to a bracket 8 on the frame 1 by a reactionary member 4, and between the axle and the frame is interposed the elastic force component 2, comprising a case 9 pivoted to the frame 1 by means of a bracket 10, a piston 11 (see Fig. 11) connected to a rod 12 and a compression spring 13 (see Fig. 11) interposed between the said piston 11 and the top closed end of the case 9.

In Fig. 7 is shown this invention applied to the rear axle 7 of a motor car. A pillar 14 is pivoted to the axle 7 and forms a connection between said axle and frame 1 by a reactionary member 4. To the junction between the pillar 14 and member 4 is attached one end of an elastic force component 2 which is pivoted at its other end to the frame 1.

In this arrangement load increments will cause the member 4 to assume a more angular position and the elastic force component 2 will be further strained; the joint action of these being such that the load will have a decreasing mechanical advantage over the elastic force, so that the rate of change of the load with respect to the deflection of the system will be of an increasing order.

Fig. 10 is a side elevation showing a form of the invention applied to the front axle of a vehicle. The axle 15 is connected to the frame 1 by a reactionary member 4. Between the said axle and the frame is the elastic force component 2 made up of a case 9, a piston 11 connected to a rod 12 and a compression spring 13 interposed between the piston 11 and the top closed end of the case 9. The case 9 is pivoted to the frame 1 by means of a bracket 10.

Fig. 11 shows one form of the elastic force device in section. In this, the cylindrical case 9—which contains the spring 13 and plunger or piston 11 has a ball socket 20 which with the ball 21 (Figs. 11 and 13) forms a universal joint for attachment to the sprung or unsprung portion of the vehicle as the case may be. The spring 13 in the arrangement shown bears against a sliding member 22 which in turn presses against a bush 23 which is preferably made of a suitable compressible friction material. The member 22 and the end of the case 9 which is adjacent to bush 23 having opposing slanting faces for the purpose of causing the bush 23 to be compressed on to the spindle or rod 16 and in this way there is introduced a certain amount of frictional resistance to relative movement between parts 16 and 9.

The amount of frictional resistance offered by this arrangement is obviously determined by the force exerted by the spring 13 and since this force increases with vehicle load it is clear that a greater amount of frictional absorption of vibration will be provided when the vehicle is heavy laden than when light, and in fact this frictional resistance will be practically proportional to the load carried.

The bush 23 may be made of a suitable metal if desired but in this case it will be necessary to provide one or more radial slits to allow it to close on to and grip spindle 16.

In certain cases it may be advisable to attach the case 9 to the vehicle by a spherical joint in which the sphere is formed on the end of casing 9 and co-axial therewith or where the oscillations of the casing 13 is in one plane only—the arrangement shown in Fig. 12 may be used, in which a pair of pins 24 are rigidly attached to or integral with the case 9 and mounted in bearings 25 which are attached to the frame by suitable brackets such as shown in Figs. 1 and 2.

The spindle 16 may be attached to the axle in any convenient manner: for example, by ball and socket, journal bearing or by the method shown in Fig. 11 where a collar 26 is fastened to, or integral wtih the spindle 16 and rests on a substantial pad of rubber or other suitable material 27 which is housed in a socket 28 which in turn is rigidly secured to a suitable portion of the vehicle. The case 9 may also be secured to the frame by being allowed to articulate on a substantial pad or ring of rubber in much the same way as described with respect to the end of spindle 16. The spindle 16 may be allowed a certain amount of axial movement without frictional restraint by providing the arrangement shown in Fig. 15. In this case a bush 29 (which is preferably made of a suitable friction material and provided with one or more radial slits) is surrounded at its ends by rubber rings 30 which are stretched over same for the purpose of contracting bush 29 on to spindle 16 to increase frictional adhesion between these two parts. In this arrangement the spring 13 bears against a partition 31 between which and the end of case 9 is sufficient space to allow the bush 29 to move with the spindle 16; impact between the said bush 29 and case 9 being prevented by the rubber rings 30 acting as buffers.

It will thus be evident that the frictional resistance offered by the bush 29 to movements of spindle 16 will be inoperative while the bush 29 is moving axially within the space provided. Helical springs made in the form of rings may be used instead of rubber.

The friction bush 23 shown in Fig. 11 may also be used within a conically ended chamber in the same way if provided with suitable radial slits and made a tight fit on spindle 16, and impact between this bush and the ends of the chamber may be silenced by suitable rubber buffers.

Fig. 18 is a sectional view of a modified form of elastic member. This form comprises a pair of tubes 57 and 58 telescoping one within the other, and a spring 13 introduced between them and bearing against the closed ends thereof. The ends 59 and 60 are bearings which may be cylindrical or spherical according to whether the movement to be accommodated is in one plane or more than one plane.

Fig. 19 shows a method of damping by applying frictional restraint to the lengthening or shortening of the elastic member, the measure of such restraint being in accordance with the varying force of the spring 13. In this arrangement a conical collar 61 is rigidly attached to, or integral with, the rod 16, and the piston 11, which is surrounded with a suitable friction material 62 is conically recessed and radially slotted so that the force of the spring 13 causes it to expand against the wall of the case 9. This expansion will produce frictional resistance to the movement of the piston within the case 9, and the measure of such resistance at any moment is controlled by the prevailing force of the spring 13.

The reactionary force component may be provided with an enlarged end as shown at 51 in Figs. 16 and 17, and friction material 52 introduced between this enlarged end and a bracket 53 depending from the frame for the purpose of increasing frictional resistance, and a suitable spring 54 and nut 55 may be also provided to facilitate adjustment of same. Alternatively, both ends of the member may be so enlarged.

With the parts arranged as described adjustments may be made in order to get the best effect with varying loads.

In the above constructions the arrangement of the parts are such that load increments will cause the said elastic force component to assume a more vertical position, and the joint action of the elastic force component and reactionary force component is to produce a vertical force component for the support of the vehicle load, which becomes a greater proportion of the force exerted by the said elastic member as the load is increased. In this way compensation is made for the variation in load so as to maintain a practically constant vibration period.

Referring to Figs. 4, 7 and 10 it will be seen that the reactionary member is in the form of a pivoted lever 4, which is so arranged that under load increments its inclination to the horizontal increases, and advantage is taken of this to give the parts such values that the rate of change of the load with respect to the deflection of the system is of an increasing order such that the quotient obtained by dividing the load by the rate of change of the load with respect to the deflection is substantially constant throughout the range of deflection.

Referring to the graph Fig. 20, line A—B is the load-deflection curve of the applicant's system designed to give a constant periodicity of 80, and line A—D is that of the usual harmonic system designed to give the same period at a maximum loading of 850 lbs. as shown by the line E—E. Since as has been previously explained the periodicity varies as $$\sqrt{\frac{W}{\frac{dw}{dD}}}$$

it will be graphically determined in the case of the line A—D by the abscissa of any point and in the case of the curve A—B by the corresponding subtangent. From this it will be clear that the periodicity of the harmonic system for light loads (say 450 lbs. as given by the line F—F) is determined by a deflection of 2.9" which corresponds to a periodicity of 110, whereas the curve of the applicant's system at this point has a subtangent of approximately 5½" as shown at G—H which gives a periodicity of 80, the said subtangent being practically constant throughout the loading range.

In this graph the slope of the curve A—B is the same as that of the curve A—D where both curves are intersected by the line E—E, so that the subtangent J—K is the same as the abscissa A—L; the latter being the deflection for that loading with respect to curve A—D. The periodicities are therefore, as already stated, the same for both systems under this loading.

Fig. 3 shows in dotted outline the versin foreshortening of the lever 4 in Figs. 1 and 2. Fig. 5 in dotted outline the versin foreshortening of the lever 4 in Fig. 4.

Fig. 9 shows in dotted outline the versin foreshortening of the lever 4 in Fig. 7. If the arrangement shown by Fig. 7 and illustrated diagrammatically in Fig. 8 be proportioned as follows, viz., lever 4, twelve inches; unstrained length of elastic member, thirteen inches; the elastic member giving a force of eighty five pounds per inch of strain, and the parts being so related that the side X is twenty-eight inches, and the angle A thirty degrees, the value of $$\frac{W}{\frac{dw}{dD}}$$

at various stages of the loading range is found to be in accordance with the following table:—

| W in pounds | $\frac{W}{\frac{dw}{dD}}$ |
|---|---|
| 600 | 5.4 |
| 700 | 5.5 |
| 800 | 5.5 |
| 900 | 5.8 |

These figures are obtained from the force-deflection curve of a system dimensioned as above given.

The corresponding values of $$\frac{W}{\frac{dw}{dD}}$$

for the usual harmonic type of suspension system (designed to give the same periodicity at the maximum load of 900 lbs.) are as follows:—

| W in pounds | $\dfrac{W}{\dfrac{dw}{dD}}$ |
|---|---|
| 600 | 3.8 |
| 700 | 4.5 |
| 800 | 5.1 |
| 900 | 5.8 |

Periodicity and $$\frac{W}{\dfrac{dw}{dD}}$$

are related by the following formula $$\text{periodicity} = \sqrt{\frac{35230}{\dfrac{W}{\dfrac{dw}{dD}}}}$$

from which it follows that the periodicity with respect to the foregoing figures varies between 81 and 78 for the applicant's system as compared with a variation of 96 to 78 for the usual harmonic system.

Fig. 6 shows diagrammatically the construction shown in Fig. 4. Now with a proportioning as follows, viz., lever 4, ten inches, unstrained length of elastic tie, 18 inches, the elastic member giving a force of sixty pounds per inch of strain, and the angle A being 160 degrees, the values are as follows:

| W in pounds | $\dfrac{W}{\dfrac{dw}{dD}}$ | Periodicity |
|---|---|---|
| 450 | 5.7 | 79 |
| 600 | 5.5 | 80 |
| 700 | 5.3 | 81 |
| 800 | 5.1 | 83 |

As previously stated by the method of spring suspension according to the present invention the mechanical parts are so proportioned and arranged that the load is mounted on the aforesaid suspension system under conditions such that the system is responsive to load increments in such a manner that the vertical force component of the elastic medium for the support of the vehicle load becomes a greater proportion of the force exerted by the said elastic medium as the vehicle load is increased.

It will thus be seen that by the present invention is that substantially the same periodicity can be realized with light loads as with heavy loads, and that this periodicity can be a very low and comfortable one comparable to that which usually obtains only with heavy loads in suspension systems of the harmonic type. We prefer that such periodicity should not arise above 100 periods per minute in the case of ordinary vehicles and the arrangements I have shown give a periodicity of about 80 which is the most comfortable in practice.

This is clearly shown in Figs. 6 and 8. 2 is the spring or elastic force component and 4 the reactionary component or pivoted lever. The triangle 100 represents graphically the forces, $c$ being the force and direction of pull of the spring, $a$ the vertical force component which in practice is the load on the system, and $b$ the horizontal force component thereof which corresponds to the reactionary force on the component 4.

The triangles 100 correspond to the normal condition of the parts 2 and 4. On a certain increase of the load the parts 2 and 4 will assume the positions indicated by the triangles 200. An examination of 100 and 200 will show that at 200 (the advanced position) the vertical force component $a$ is a greater proportion of the spring force $c$ than is the case at 100, from which it follows that the force deflection curve will be of the order shown at F in Fig. 21 in which the rate of change of $f$ (representing the vertical force component) with respect to $d$ (the vertical displacement of the end of the reactionary member) is of an increasing order, and under the present invention the parts are so proportioned and arranged as to produce a force deflection curve in which the subtangent is substantially constant throughout the loading range, the said subtangent being the graphical equivalent of $$\frac{W}{\dfrac{dw}{dD}}$$

as given previously.

What I claim is:—

1. In a vehicle, a running gear, a chassis, and means for suspending the chassis from the running gear comprising two levers and a spring device connected together at adjacent ends, the spring device and one of said levers being connected at their other ends to the chassis and the other lever being connected at its other end to the running gear, said levers and spring device having a normal angular relationship such that they cooperate to yieldably support the load of the chassis upon the frame and also such that the mechanical advantage of the spring device is increased with increase in the load.

2. In a vehicle, a running gear, a chassis, and means for suspending the chassis from the running gear comprising a spring device and a lever each pivotally connected at one end to the chassis and connected together at their other ends, said spring device and said lever having a normal angular relationship whereby they cooperate to yieldably sustain load applied at their adjacent connected ends and whereby increase in the load increases their mechanical advantage, and a connection between the running gear and the connected together ends of said lever and said spring device whereby the chassis load is transmitted through said spring device and said lever to the running gear.

3. In a vehicle, a running gear, a chassis, and means for suspending the chassis from the running gear comprising a spring device and a lever connected together at adjacent ends and each fastened to the chassis for movement to change their angular relationship, and a connection between the running gear and the adjacent connected ends of said spring device and said lever, said spring device and said lever having a normally acute angular relationship and their connection with the running gear being disposed so that the load of the chassis tends to swing the lever towards the spring device whereby the mechanical advantage of the suspension is increased with increase in the chassis load.

4. In a vehicle, a running gear, a chassis, and means for suspending the chassis from the running gear comprising a spring device and a lever connected together at adjacent ends and each fastened to the chassis for movement to change their angular relationship, and a connection between the running gear and the adjacent connected ends of said spring device and said lever, said spring device and said lever having a normally obtuse angular relationship and their connection with the running gear being disposed so that the load of the chassis tends to swing the lever away from the spring device whereby the mechanical advantage of the suspension is increased with increase in the chassis load.

In testimony whereof, I affix my signature.

SIDNEY ADOLPH HORSTMANN.